(12) United States Patent
Kurtz et al.

(10) Patent No.: US 7,909,987 B2
(45) Date of Patent: Mar. 22, 2011

(54) PROCESS FOR MANUFACTURING A MICROREACTOR AND ITS USE AS A REFORMER

(75) Inventors: Olaf Kurtz, Berlin (DE); Ralph Herber, Berlin (DE); Christian Madry, Berlin (DE); Gerd Schäfer, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 493 days.

(21) Appl. No.: 12/085,302

(22) PCT Filed: Feb. 22, 2007

(86) PCT No.: PCT/EP2007/001690
§ 371 (c)(1),
(2), (4) Date: May 21, 2008

(87) PCT Pub. No.: WO2007/096198
PCT Pub. Date: Aug. 30, 2007

(65) Prior Publication Data
US 2009/0250379 A1    Oct. 8, 2009

(30) Foreign Application Priority Data
Feb. 23, 2006  (EP) ..................... 06003655

(51) Int. Cl.
*C01G 35/04* (2006.01)
*B21D 51/16* (2006.01)
*B01J 8/02* (2006.01)
*H01M 8/06* (2006.01)
(52) U.S. Cl. ............ 208/134; 29/890; 216/39; 422/211; 429/424; 429/425

(58) Field of Classification Search .................. 208/134; 29/890; 216/39; 422/211; 429/424, 425
See application file for complete search history.

(56) References Cited

U.S. PATENT DOCUMENTS 6,409,072 B1    6/2002  Breuer et al.
6,470,569 B1 *  10/2002 Lippert et al. .................. 29/890
(Continued)

FOREIGN PATENT DOCUMENTS

DE     19708472      9/1998
DE     19825102     12/1999
(Continued)

OTHER PUBLICATIONS

J.M. Thomas, W.J. Thomas, "Principles and Practice of Heterogeneous Catalysis", Verlag Chemie, Weinheim, 1997.
W. Ehrfeld, V. Hessel, H. Lowe, "Microreactors", WILEY-VCH Verlag, 2000.

(Continued)

*Primary Examiner* — Glenn Caldarola
*Assistant Examiner* — Randy Boyer
(74) *Attorney, Agent, or Firm* — Frank J. Bonini, Jr.; John F. A. Earley, III; Harding, Earley, Follmer & Frailey, P.C.

(57) ABSTRACT

For manufacturing micro-structured reactors with passageways loaded with catalyst using the pre-coat method, a method is provided which comprises the following method steps: a) producing reactor layers having bonding areas as well as passageway areas in which the passageways are formed, b) applying at least one bonding layer onto the reactor layers in the bonding areas, c) loading the reactor layers in the passageway areas with the catalyst and d) bonding the reactor layers, the bonding layer being applied and masked before the reactor layers are loaded with the catalyst. As a result, it is ensured that the efficiency of the catalyst will not be affected during manufacturing. The reactor may be used as a methane and methanol reformer in particular.

25 Claims, 6 Drawing Sheets

U.S. PATENT DOCUMENTS 6,736,983 B1    5/2004    Thies et al.
2004/0084509 A1    5/2004    Meyer et al.

FOREIGN PATENT DOCUMENTS

EP    1198344    4/2002
EP    1415748    5/2004

OTHER PUBLICATIONS

DVS Berichte 132, DVS Verlad, 1990.
Srinivas S et al: "A scalable silicon microreactor for . . ." Applied Catalysis A: general elsevier science, Amsterdam, NL Bd. 274, Nr. 1-2, Oct. 28, 2001, S 285-293, XP 00458626, IssN: 0926-860X.

* cited by examiner

PROCESS FOR MANUFACTURING A MICROREACTOR AND ITS USE AS A REFORMER

FIELD OF THE INVENTION

The present invention relates to a method of manufacturing a chemical reactor which comprises passageways loaded with catalyst as well as to the use of a reactor manufactured in accordance with the invention as a hydrocarbon and alcohol reformer.

BACKGROUND ART

As a result of increasing miniaturization and of the need of ever more efficient energy management, both in terms of processing and engineering, in the design of components and systems (system integration) of chemical reactors, micro-structured reactors, heat exchangers and coolers (micro-structured components) are used both in research and development projects and even start to be utilized in first industrial processes. Micro-structured components generally consist of a stack of thin metal sheets which are characterized by fine structures. Components having very fine channels are obtained by bonding the structured metal sheets. The metal sheets may be structured by dry etching, wet chemical deep etching or by mechanical micro-production.

Usually, the structured metal sheets are provided with a cover and a bottom plate and assembled into a compact component part. If the component parts are constructed accordingly, maximum heat and power exchange may be achieved with minimum component volume, with the flow conditions in the component being selectively adjustable and isothermal conditions being achievable in the micro-channels.

This structure, typically having channel depths in the range of from 50 to 2000 µm, may be produced by dry etching, wet chemical deep etching, laser beam, LIGA methods, spark erosion or by mechanical micro-production for example. The reactors may also be manufactured using methods of the silicon chip technology for example (for bonding the various layers, the typical bonding conditions indicated are 450° C., 750V: anodic bonding). The structured layers of these components, sheet metals for the major part, are finally provided with a cover and a bottom plate and bonded into a compact component part. For the connections of the inlet and outlet region, two or more passageways are preferably etched, punched or lasered into the cover plate.

Micro-structured reactors typically have an inlet region into which reactants enter through an appropriate connection and from which they spread homogeneously over channels from which the products generated in the channels are caused to exit the reactor through an outlet region. The channels may be catalytically coated. The geometry and arrangement of these channels and of the webs between these channels are thereby designed so that fluid dynamics, heat transfer and pressure loss have an optimum ratio with respect to one another, said ratio being defined by the respective application. The inner structure of the components allows for maximum heat and power exchange on minimum surface area, while the flow conditions are specifically adjustable and high isothermy prevails in the channels. This isothermy is a major prerequisite in avoiding, inside the fluid channels, what are referred to as hot and cold spots, which may adversely affect the activity or even deactivate applied catalysts. Beside avoiding hot and cold spots, the possibility of a more precise temperature control during reactor operation as compared to conventional reactors also results in suppressing undesired side reactions, in increasing the selectivity or the product yield and finally in considerably increasing the profitability of chemical reactions. In addition thereto, deposits, such as those caused by carbonization, onto a catalyst system may be avoided by this temperature control.

Moreover, fast heat dissipation in micro-structured reactors may ensure increased security standards. Strong exothermic reactions may thus be controlled—even within the explosion limits. Further, by virtue of the short thermal response times, the reactors systems described are particularly suited for dynamic processes which require fast changing reaction conditions such as flow rate and temperature.

More than 90% of all chemical industrial production processes are carried out with catalysts (J. M. Thomas, W. J. Thomas, "Principles and Practice of Heterogeneous Catalysis", Verlag Chemie, Weinheim, 1997). This applies in particular for gas phase reactions. In view of this huge number, the problem, which has not yet been solved in practice, consists in finding a way to successfully run catalyzed reactions in micro-structured reactors on an industrial scale.

For loading conventional reactors, catalytically active pellets, balls, Raschig rings, Berl saddles, powder and so on, which are introduced in bulk into the catalyst bed of a solid bed reactor, are commercially available. For reactions with a particularly short dwell time, catalyst meshes, mostly noble metal meshes, are utilized. These forms of commercializing coatings and catalysts cannot, or only conditionally, be used for micro-structured reactors. This is due for example to the risk of clogging of the channels, the increased pressure drop, the inhomogeneous flow profile, the inhomogeneous concentration and temperature profiles resulting therefrom as well as the appearance of the hot/cold spots, which are all due to the form given to the catalyst. This is the reason why micro-structured reactors are, inter alia, coated using what is referred to as wash-coat (slurry coating) or the sol-gel method in order to form particularly thin catalyst layers by physical vapor deposition (PVD) or chemical vapor deposition (CVD), by wet impregnation or precipitation (W. Ehrfeld, V. Hessel, H. Löwe "Microreactors", WILEY-VCH Verlag, 2000). All the coating methods rely on only loading the reaction channels with catalyst after the reactor has been bonded, this process being referred to herein after as post-coat, meaning that the catalyst is introduced into the channels only upon completion of the reactor, inclusive of the mounting of the inlet and outlet connections. The viscosity of the suspensions and emulsions used hereby limits the minimum diameter needed for the channels of the reactors used in order to prevent them from clogging. The amount and the distribution homogeneity of the catalyst applied can no longer be subjected to non-destructive control once the reactor has been mounted. The inlet and outlet regions are thus also contaminated with the catalyst or even completely coated so that reactions occur prematurely or continue to occur outside of the structured reactor core. This may result in poorer temperature control and, as a result thereof, in poorer reaction control, in undesired side reactions and in reduced conversion and reduced selectivity. To a large extent, the advantages of the micro-structure technology are thus lost.

Another reason why the catalyst was to be introduced into the reactor after carrying out the bonding process is that the techniques for finally, irreversibly joining (bonding) the reactors used for all the methods of manufacturing micro-structured reactors hitherto produced were techniques in which the catalyst would have been otherwise destroyed or seriously affected. The only alternative found was not to bond but to screw the reactor together. On the laboratory scale, micro-structured reactors made from a solid housing into which loosely stacked or mechanically carried foils are introduced together with the catalyst are utilized. Usually, these reactors are mounted by mechanical screwing. One advantage is that the discrete foils can be readily replaced without destroying the housing. Major disadvantages are the risk of leakage, which involves potential leakage of hazardous substances as well as poorer thermal coupling. For this reason, seals are needed in reactors bonded this way, said seals significantly limiting the applicable temperature range. Additionally, thermal coupling and, as a result thereof, heat distribution in full metal (not screwed) reactors and, hence, process control are significantly improved.

For the reasons mentioned, various attempts have been made to introduce the catalyst into the reaction channels before assembly. Such a method is referred to as pre-coat, in contrast to post-coat.

The pre-coating method for loading catalysts into a reactor allows for precise quality control of the applied catalyst layers with regard to coating thickness, amount of catalyst, homogeneity and site of deposition. It moreover prevents contamination of the inlet and outlet regions through the catalyst. For the first time, the micro-structure may be loaded with temperature-sensitive catalyst if a suited bonding process is utilized. This opens a wide field of heterogeneous catalyst applications to the micro-structure technology. The prerequisite for the utilization of temperature-sensitive catalysts is a bonding temperature adapted to the temperature stability of the catalyst, while it must be ensured that the temperature stability of the reactor is sufficient to carry out the chemical conversion.

However, all the methods of bonding micro-structured reactors presently preferably used in practice do not allow for a pre-coat method for applying the catalyst because of the process conditions and/or the additives used (e.g., fluxing agents):

Diffusion welding requires a high bonding temperature (of 1000° C. for example), a high pressure as well as a good vacuum during bonding. A good vacuum is used to minimize the formation of oxides at the surface of the components to be bonded since oxide layers would considerably affect successful bonding. Another disadvantage of this method is the long holding and processing time. The high temperature required makes the use of diffusion welding for pre-coat temperature-sensitive catalysts totally inadequate. According to current state of knowledge, even acknowledged high temperature catalysts are deactivated or their activity is considerably affected under these process conditions.

DE 198 25 102 C2 describes a method of manufacturing a compact catalytic reactor. This method comprises catalyst application before bonding and soldering for bonding the component. As contrasted to the method of the invention, DE 198 25 102 C2 does not teach to apply the bonding layer in the passageways or on the webs. The lack of bond across the webs generally leads to poorer thermal coupling of the various reactor layers. The interrupted heat conduction between the reactor layers prevents isothermy, which is a major method advantage in full-metal micro-structured components, thus leading to minimized temperature control of the reactions within the reactor. Transverse leaks may further appear between the various passageways, such leaks leading to undesired mixtures and reactions. This may happen at the expense of selectivity and yield. In order to ensure tightness from outside, the borders are merely bent before the various reactor layers are stacked onto each other. This is necessary since the bonding process described in DE 198 25 102 C2, which uses solder foils, does not ensure a gas-tight bond. Moreover, the use of solder foils may cause clogging of the passageways.

Adhesive bonds do not sufficiently meet the required temperature resistance and significantly affect the thermal conductivity of the components. Furthermore, additives, solvents or the adhesive bond itself interact with the catalysts used. Further, the risk that the channels become clogged by inhomogeneous application of an adhesive is very high.

Soft soldering as a thermal bonding method carried out in vacuum or in an inert gas atmosphere, is utilized on a large scale. The solder foils or pastes used thereby on the microstructure cause the channels to become clogged so that they are not suited for use in bonding micro-structured components. Further, the addition of fluxing agents may cause corrosion because of its accumulation in the solder gap of the microchannels, too short a temperature profile or a wrong chemical composition of the fluxing agent causes the formation of cavities and moreover involves high environmental impact that may only be minimized by complex and cost-intensive waste water and air purification. Furthermore, undesired reactions between the fluxing agent and alloy additives of the base material may occur, thus preventing successful bonding. The use of fluxing agents in the manufacturing of catalytically coated reactors may deactivate the catalyst.

Beside the advantages mentioned above regarding reaction control and high security standards, a micro-structured component should meet the following important technical requirements:
1. Sufficient tightness, both between the channels and against the surroundings;
2. Sufficient pressure resistance or strength;
3. Sufficient corrosion resistance against the media used;
4. Sufficient temperature resistance;
5. Free, geometrically homogeneous fluid channels.

The major demands placed on the manufacturing method may be summarized as follows:
1. High flexibility and adaptability to the overall system or the peripheral geometries;
2. High flexibility in the design according to the given specification;
3. Scalability to low-cost industrial mass production;
4. The bonding method must allow for the possibility of the pre-coat;
5. The activity of the catalysts must not be affected.

Hitherto, there is no low-cost method suited for industrial scale for manufacturing catalytically coated micro-reactors for low temperature and high temperature applications that would meet all of these requirements. Hitherto, micro-structured reactors have been almost exclusively utilized to carry out non-catalytic reactions because there was no convincing technique for coating the channels that could be used together with the method of manufacturing the entire component.

A gentle method of assembling micro-structured component layers suited for manufacturing micro-structured components has been described in EP 1 415 748 A2. This documents mentions, inter alia, the melt diffusion method. This method is understood to refer to a soldering method in which several elements of the solder interdiffuse, thereby forming intermetallic phases. The composition and thickness of partial solder layers may be for example matched in such a manner than an initial eutectic forms during bonding. Accordingly, a very low melting temperature is achieved at the beginning. With interdiffusion of the solder elements between various partial solder layers, the melting point progressively shifts to a higher value during the soldering process. By tempering the bond, a solid solder bond is progressively obtained with this method, said solder bond having a melting point that is considerably higher than the initial melting point when the solder layer starts melting. As a result, soldering may occur at a very low soldering temperature. This in particular allows very gentle processing of the various component layers so that warping of the discrete layers when subjected to thermal load may be practically excluded.

Further, EP 1 198 344 B1 indicates a method of manufacturing micro-components in which a catalyst is applied to the channel walls prior to bonding the various component layers. According to this document, channels are formed first. For this purpose, a copper foil is coated with a structuring cover layer (a photoresist layer, a screen printing lacquer layer, a perforated foil or a metal resist layer). The channel areas are thereby left uncoated or are exposed. The copper foil is etched in the bare areas, e.g., with a $FeCl_3$/HCl solution, so that recesses corresponding to the channels to be formed are formed in these areas. Next, catalyst is formed on the channel walls only. The catalyst in the channels is thereafter coated with another cover layer. Subsequent thereto, the cover layer is selectively removed. Then, a bonding layer may be deposited in the exposed areas. After the cover layer has been removed from the channels, several layers made in this way are joined by soldering. It has been found that the efficiency of the catalyst during manufacturing is considerably reduced if not completely eliminated.

Accordingly, it is the object of the present invention to eliminate the disadvantages of the prior art methods and more specifically to find a method of manufacturing micro-structured reactors that makes it possible to manufacture micro-structured reactors loaded with a catalyst in compliance with the technical requirements and the production method. In this way, micro-structured reactors may also be utilized in heterogeneously catalyzed reactions. Moreover, the manufacturing method must offer the possibility of low-cost industrial conversion for manufacturing micro-structured components. It finally aims at finding a method of manufacturing micro-structured reactors that may be utilized as hydrocarbon and alcohol reformers, in particular as methane and methanol reformers. The reactors thus produced should be small, light in weight and compact for varied and above all mobile applications in particular. The manufacturing method should be automatable and scalable. Eventually, the method should serve to manufacture reactors having a high WHSV (weight hourly spatial velocity: amount of converted material [g] in the reactor per catalyst mass [g]×operating time of the reactor [h]).

SUMMARY OF THE INVENTION

The above objects are achieved by the method as set forth in claim 1 and by the use of a reactor manufactured using this method as set forth in claim 23. Preferred embodiments of the invention are indicated in the dependent claims.

The method of the invention serves to manufacture micro-structured reactors consisting of micro- or milli-structured component (reactor) layers, more specifically of metal sheets and comprising passageways, channels in particular, which are loaded with catalyst. The reactor is preferably used for carrying out catalyzed reactions.

The reactor manufactured using the method of the invention may be utilized in particular in hydrocarbon reformation, more specifically in methane reformation, and in alcohol reformation, more specifically in methanol reformation. High-purity hydrogen gas or high-purity synthesis gas may be produced with these methods.

The passageways in the reactor are loaded with a catalyst using the pre-coat method. For this purpose, a method involving the following method steps is utilized:
 a. Making the reactor layers; the reactor layers have bonding areas through which a plurality of reactor layers are bonded together, passageway areas in which the passageways are formed, as well as, at need, other areas such as areas for accommodating electric component parts;
 b. Depositing at least one bonding layer onto the reactor layers (at least) in the bonding areas,
 c. Loading the passageway areas in the reactor layers with the catalyst and
 d. Bonding the reactor layers.

In accordance with the invention, the bonding layer is deposited before the reactor layers are loaded with the catalyst. A constituent part of the bonding layer may be a solder (soft solder) or brazing (hard solder) layer or an auxiliary bonding layer. According to DIN 8505, the (brazing) solder (brazing (hard) solder or (soft) solder) layer is characterized in that it melts during soldering/brazing, thus wetting the base material. The working temperature is above the melting temperature of the (brazing) solder layer; wherein the (brazing) solder layer may consist of one or a plurality of chemical elements. The auxiliary bonding layer is characterized in that it does not melt during bonding, i.e., the working temperature is selected to be lower than its melting point.

Prior to loading the reactor layers with the catalyst, the bonding layer is masked in the bonding areas. As a result, the catalyst cannot come into contact with the bonding layer provided for in the bonding area. The mask used for masking is removed prior to bonding and after the reactor layers have been loaded with the catalyst.

By first depositing the bonding layer and by only then loading the reactor layers with the catalyst, the catalyst may be left completely unaffected by the method steps needed to form the bonding layer. The case in which the bonding layer is formed only after loading the reactor layers with the catalyst have found to be disadvantageous: in this case, there should be provided that the catalyst in the passageway areas be covered in order to prevent the bonding layer from being deposited onto the catalyst. Tests have shown that the activity of the catalyst is significantly influenced, in a more disadvantageous case, affected, or that its efficiency is even eliminated by a method used for coating it with a lacquer or any other cover. In such a case, the adverse influence on the activity of the catalyst may for example be due to chemicals that are used to remove the lacquer or the other cover from the catalyst. This is the reason why the reactor layers are only loaded with the catalyst, once the bonding layer has been applied. If possible immediately after catalyst loading, the reactor layers may be stacked and bonded after having removed the resist or protective lacquer.

It has further been found that, in order to ensure orderly bonding of the various component layers so as to allow manufacturing a fluid-tight and corrosion-resistant reactor on an industrial scale, it is advantageous to make certain that the bonding layer is not affected by the catalyst. In this respect, EP 1 198 344 teaches to only form catalyst layers on the channel walls for this purpose. In order to achieve this, the catalyst layer, in accordance with this document, is first formed in the channels. Then, the previously applied cover layer located in the bonding areas is selectively removed from the areas on the reactor layers for forming the bonding layer. As already indicated, the method indicated in this document however is not suited to also keep the catalyst activity unaffected. Only by forming the bonding layer according to the method of the invention already before loading the reactor layers with the catalyst and by masking it with a cover mask will it be possible to avoid affecting the efficiency of the catalyst on the one side and to prevent the catalyst from being applied to the bonding layer on the other side. Subsequent to loading the reactor layers with the catalyst, the cover mask can be removed from the bonding layer by wet chemical or dry removal.

In a preferred embodiment, the at least one bonding layer is deposited in the bonding areas only or over the entire surface of the reactor layers. In the first case, the passageway areas are kept free of the bonding layer whereas the passageway areas are also coated with the bonding layer when the bonding layer is applied on the entire surface of the reactor layers, as in the second case, so that in this latter case the catalyst is deposited onto the bonding layer in the passageway areas. In this case, the bonding layer may serve as a barrier coating or as an adhesive agent between the catalyst and the material of the reactor layer.

In the passageway areas on the reactor layers, recesses, more preferably trenches, are preferably formed in the layers. Alternatively, recesses may also be formed by metal buildups on the reactor layers. Said recesses form the passageways in the reactor once the layers have been stacked and bonded together. These recesses in the reactor layers may be formed either before or after depositing the bonding layer. Thereafter, the recesses are loaded with the catalyst. If the recesses are formed in the reactor layer only after the bonding layer has been deposited, they must be formed throughout the bonding layer if the bonding layer has been applied over the entire surface of the reactor layers. For this purpose, the bonding layer may be removed using the same method to be used for the removal of the base material from which the reactor layers are made. In this method variant, it is sufficient to use only one single structuring method both for forming the recesses and for applying the bonding layer, for example by means of only one metal mask. If in this case the bonding layer is only deposited onto the reactor layers in the bonding areas, the bonding layer may also serve as an etch resist during the subsequent formation of the recesses so that another structuring method needs not be utilized in this case either. On the other side, the recesses may also be formed already before the bonding layer is applied. In this event though, two different structuring methods must be used for forming the recesses and for depositing the bonding layer since these two steps are carried out separately. This however is only necessary, in case the bonding layer is intended to be deposited in the bonding areas of the reactor layers only. If, by contrast, the bonding layer is intended to be deposited on the entire surface of the reactor layers after formation of the recesses, meaning if it is intended to be deposited in the recesses as well, the bonding layer needs not be further structured. In the last event, the bonding layer, if suitably chosen, may also serve as an adhesive layer between the catalyst and the base material from which the reactor layers are made.

The following methods are used, inter alia, to introduce the catalyst into the micro-channels: by painting, doctor-blading, splashing, wiping, screen printing, dispensing or the like application techniques, either selectively (i.e., only in certain areas of the reactor layers) or on the entire surface. The catalyst is preferably applied onto the reactor layers using the wash-coat method. The wash-coat method is generally known. It comprises slurrying the catalyst with a liquid, such as water or alcohol, and bringing the reactor layers into contact with said slurry. The slurry contains at least one catalyst carrier or its precursor, at least one catalytic metal or its precursor as well as dispersion agents and other additives.

The catalyst carrier may for example be a zeolite, titanium dioxide, zirconium dioxide, zinc oxide, an oxide of the rare earths, a spinel, aluminium oxide or mixed oxide. The catalytic metal may for example be a metal of Group VIIIA or Group IB of the Periodic System of Elements, meaning Fe, Co, Ni, Ru, Rh, Pd, Os, Ir, Pt, Cu, Ag, Au or a mixture of these elements. In most cases, the catalysts may consist of three components: of an inert carrier ($Al_2O_3$, $TiO_2$, $ZrO_2$ and other similar oxides), of a promoter (ZnO, $CeO_2$ and other similar oxides), that is also part of the catalyst carrier and of the catalytically active species (in most cases Cu or Pd). Areas of the reactor layers that are not intended to, or are not allowed to be, catalytically coated, in particular the bonding areas—as indicated herein above—are either protected (masked) with corresponding covers, for example with cover stripes, protective lacquers, covering devices with seals, resists or the like or they may be cleaned mechanically, by wiping or grinding for example. These latter methods however are not suited for production on an industrial scale because there is the risk that the catalyst be at least partially removed from the recesses during the selective mechanical removal of the catalyst from the bonding areas. Concurrently, it must be made certain that the catalyst be completely removed from the bonding areas. According to the future function of the reactor, different catalysts may be applied to different structured reactor layers, so that endothermic and exothermic reactions may be combined in one reactor for example. After the reactor layers have been loaded with the catalyst, the cover is removed from the bonding areas.

The catalyst slurry deposited with the wash-coat method is finally dried, preferably below the soldering/brazing temperature, and then calcined in order to obtain the porous structure of the catalyst carrier with the largest possible inner surface and freely accessible catalytic centers, which is beneficial to the catalyst. The slurry is preferably dried before bonding the reactor layers. In the dry condition, the wash-coat layer should strongly adhere to the recesses. The dried catalyst slurry may be preferably calcined while bonding the reactor layers since the solvent and additives still remaining in the dried slurry evaporate at the temperature used for bonding. The desired porous catalyst structure is formed thereby. Since the catalyst is applied using the pre-coat method, it may be characterized and its coating thickness and the homogeneity of the distribution in the recesses may be checked and determined before further processing.

The micro- or milli-structured component manufactured using the method of the invention may be made from metallic, ceramic or polymer base materials. Components in which the reactor layers are made from metal are preferred, for example components made from aluminium, steel, preferably stainless steel, nickel, more specifically nickel super alloys, i.e., nickel base alloys with a nickel content of at least 28 wt. %, titanium, copper, tantalum and from alloys of these metals with each other and/or with other metals and semi-metals. For example aluminium alloys with silicon, nickel alloys with chromium and nickel and stainless steels alloyed with aluminium are particularly well suited. The reactor layers may further also consist of silicon and a glass panel may be used as a cover for example. $\alpha$-$Al_2O_3$ is the ceramic of choice.

Prior to loading the passageway areas of the reactor layers with the catalyst, a layer made from an oxide material may be formed in the passageway areas. This oxide material more particularly mediates the contact between the catalyst and the reactor layer so that the catalyst is adhesively bonded in the recesses. Such type oxide intermediate layers are particularly suited if the base material from which the reactor layers are made is an oxide or forms an oxide surface such as aluminium and the alloys thereof. A particularly advantageous oxide material is selected from the group comprising aluminium oxide, silica and silicate, alumosilicates, titanium dioxide and zirconium dioxide.

Methods of producing the recesses are described in DE 197 08 472 C2 for example. According to this document, methods may be utilized in particular that are also known for producing printed circuit boards (subtractive, semi-additive, additive methods). More specifically, such type methods are plating methods and chemical etching methods. According to DE 197 08 472 C2, the recesses may for example be formed with the following method steps in accordance with the subtractive method: a) forming fluid channel structures on metal surfaces of the reactor layer by means of a photoresist layer, a screen printing lacquer layer or any other cover layer leaving the reactor layers in the passageway areas exposed, and b) at least partially removing metal from the exposed areas of the reactor layers by electroless and/or electrochemical etching. The recesses are produced by etching metal away. According to another method variant of the subtractive method, the recesses may be formed after method step a) of the method described herein above, by performing the following method steps: b) electroless and/or electrochemically depositing an etch resistant metal layer onto the exposed surfaces of the reactor layers, c) completely removing the cover layer and d) at least partially removing the metal of the reactor layers by electroless and/or electrochemical etching, thus forming the recesses. In this case, the cover layer is structured in such a manner that it does not leave exposed the passageway areas on the reactor layers but covers them instead, rather leaving the bonding areas exposed. According to the additive method, the recesses may be formed after method step a) of the subtractive method, by performing the following next method step: b) depositing a metal layer onto the exposed surfaces of the reactor layers. In this case, the webs between the recesses are produced by metal deposition. For this purpose, the cover layer must leave exposed those areas of the reactor layers that do not correspond to the passageway areas but rather to the bonding areas. Once the recesses have been formed, the respective cover layer may be removed. If a photoresist is used, it is applied onto the entire surface of the reactor layer, is then exposed, depending on the method, with the negative or positive image and then developed, exposing parts of the reactor layers.

The mask technique used with these methods allows for high flexibility in realizing new designs and for swift adaptation of the design to requirement profiles changed at short notice. Structuring may however also occur mechanically, by milling, stamping, punching, spark erosion, laser ablation, dry etch methods, mechanical micro-production, and so on. Metal sheets or other foils used for the reactor layers may hereby optionally be structured on one or the two sides.

Once the micro-structure has been produced, a functional layer is built as the bonding and/or corrosion protection layer, said functional layer consisting of one or a plurality of discrete layers and being built up by selective local or full-surface electrochemical or chemical deposition. If the bonding layer is deposited locally, those areas of the substrate that are not to be coated, or must not be coated, with the bonding layer are protected using for example cover stripes, protective lacquers, cover devices with seals, resists and the like. For selectively applying the bonding layer in the bonding areas, a photoresist or an electrically non conductive coating is preferably chosen in the channels. If the solder is not deposited locally but on the entire surface, including the passageway areas, instead, the catalyst is applied onto the bonding layer in the passageway areas in another method step.

Depending on the base material to be used for making the reactor layers, on the catalyst material and on the purpose of utilization of the reactors, two bonding variants may be distinguished in principle: soldering in a preferred temperature range of from 100 to 450° C. (soft soldering) on the one side and brazing in a preferred temperature range of from 450 to 1400° C. (hard soldering) on the other side.

The bonding layer is built up from layers having different compositions by local or full-surface galvanic or chemical deposition. Prior to deposition, the micro-structured reactor layers, preferably metal sheets made from copper, tantalum, aluminium, steel, preferably stainless steel, nickel, nickel super alloys in particular, i.e., nickel base alloys with a nickel content of at least 28 wt. %, titanium and from alloys of these metals with each other and with other metals and semi-metals, are first cleaned from impurities and surface oxides by a suited chemical pre-treatment involving degreasing and pickling steps.

In a first preferred embodiment, the bonding layer is formed from at least one high melting and from at least one low melting partial (brazing) solder layer. The element combination of the high melting partial (brazing) solder layer with the low melting one may in particular be chosen taking into account the stoichiometry of desired intermetallic phases that are to be formed during the bonding process. If heat is input and pressure applied, an initial eutectic may first form in this case, thus allowing for soldering/brazing at a temperature lower than the one corresponding to the melting temperature of the (brazing) solder seam upon completion of the bonding process. By selecting or composing the (brazing) solder system and the soldering/brazing parameters accordingly, the bonding process herewith allows bonding below the maximum tolerance temperature of the catalyst so that its thermal irreversible deactivation is prevented and the temperature stability of the bond seam is preserved later on, at the operating temperature of the reactor.

The at least one high melting partial (brazing) solder layer is preferably made of a metal selected from the group comprising silver, gold, nickel and copper. The at least one low melting partial (brazing) solder layer is preferably made of a metal selected from the group comprising tin, indium and bismuth. In a more particularly preferred embodiment, the high melting partial (brazing) solder layer is made of silver and the low melting partial (brazing) solder layer is made of tin. The bonding layer may be applied to the surface of only one bonding partner or on the surfaces of the two bonding partners.

In particular when bonding is performed in the low temperature range (soft soldering), a multifunctional barrier coating, preferably a coating made from molybdenum, manganese, iron, iron/phosphorus alloy, rhenium, rhodium, platinum, palladium, nickel or nickel/phosphorus alloy, of a thickness ranging from 1 through 20 μm may further be directly applied to the reactor layers prior to applying the bonding layer. This barrier coating smoothes out irregularities at the surface of the reactor layers, offers a homogeneous base for depositing further layers, effective protection against oxide formation and assists in wetting the molten phase during soldering/brazing. When heat is input, it further forms a solid bond with the base material of the reactor layers, thus forming, in its function as the adhesive agent, the base for sufficient pressure stability and solidity of the micro-structured component. As a barrier coating, it finally is intended to prevent constituents of the bonding layer from diffusing into the base material of the reactor layers and vice versa. As a result thereof, the molten phase could become depleted and undesired interactions could take place and/or a brittle phase could form in the bond seam area. In certain cases, this could affect the bond. The same applies for interactions between constituents of the base material and the catalyst in the passageways if the barrier coating is also applied in the passageway areas. The barrier coating may more specifically be made from at least one metal selected from the group comprising molybdenum, manganese, chromium, palladium, iron, nickel and alloys of iron and/or nickel with phosphorus.

It has been found that a very advantageous embodiment is achieved with a layer sequence of 5 μm of Ni (barrier coating), 8 μm of Ag (first partial (brazing) solder layer) and 3 μm of Sn (second partial (brazing) solder layer).

According to the first preferred embodiment, the layer of the higher melting metal is applied in a preferred coating thickness ranging from 1 to 20 μm after chemical activation of the preferably applied multifunctional barrier coating and then, the low melting metal is applied in a coating thickness ranging from 1 to 10 μm, also after an activation step.

If, in particular cases, the use of the multifunctional barrier coating is not necessary, the bonding layer may be built up directly by local or full-surface chemical or galvanic deposition after pre-treatment and chemical activation of the base material of the reactor layers.

The reactor layers, which are micro-structured and (brazing) solder- and catalyst-coated on one or on both sides, are then superposed so as to form a stack of adjacent layers between which there is located the bonding material. If a multifunctional barrier coating is used, the (brazing) solder is limited in space ("confined") between the barrier coatings without direct contact with the base material used for the reactor layers. Appropriate choice of the (brazing) solder system and of the solder/brazing parameters allows using the pre-coat method for applying the catalyst. Eventually, the stack is bonded, preferably soldered/brazed, in vacuum or in an inert gas atmosphere, under heat and pressure.

Concurrently, the catalyst is calcined. Further important process parameters are, beside the solder/brazing temperature and the press-on pressure, also the vacuum quality, the heating rate, the holding period and the cooling time. Exact knowledge of these process parameters is the prerequisite for controlling and selectively influencing the intermetallic reactions during the soldering (brazing) process.

In order to ensure a uniform, full-surface bond of the discrete reactor layers with each other, a minimum pressure as a function of temperature and coating thickness must be exerted homogeneously onto the stack to be soldered/brazed together. Beside improving the contact of the surfaces to be soldered/brazed together and, as a result thereof, the interdiffusion and hence the intermetallic phase formation, brittle phase formation can be advantageously influenced by the press-on pressure (DVS Berichte (reports) 132, DVS Verlag, 1990). Preventing brittle phases from occurring is one of the crucial factors for future strength, corrosion resistance and heat conduction.

To allow for gentle treatment of the catalyst when bonding the reactor layers, these are preferably bonded, using a melt diffusion method. With this method, one or two (brazing) solder layers are produced between the parts to be joined together, and the bond is heated to a temperature beyond the melting point of the (brazing) solder material. In order to allow for interdiffusion of the metals of the (brazing) solder and of the base materials of the reactor layers, the bond is heated over a longer period of time. If two different (brazing) solder metals or alloys are used, a eutectic of the two metals or alloys may also be formed. This melt diffusion soldering/brazing method results in (brazing) solder seams exhibiting high homogeneity, corrosion stability and strength. If the (brazing) solder is deposited onto the entire surface, the composition of the intermetallic phase may be chosen so as to concurrently also protect the inside of the passageways against corrosion.

In another preferred embodiment, the arrangement of reactor layers and interposed bonding layers may be heated for bonding to a temperature below the melting temperature of the material of the bonding layer. In this case, the bonding layer cannot be considered a (brazing) solder layer because (brazing) solder layers are generally understood to melt during bonding, thus wetting the bonding partners. In this case, the bonding layer is an auxiliary bonding layer. In order to achieve an intimate bond between the reactor layers in this case as well, the bonding layer preferably contains a non-metal and/or a semi-metal selected from the group comprising phosphorus, boron and carbon. In this case, the bonding layer further preferably contains at least one transition metal selected from the group comprising silver, copper, gold, palladium, zinc, nickel, iron, cobalt, chromium and manganese. The semi-metal or non-metal element, as well as the elements of the base material, interdiffuse in a solid state reaction until the concentration in the bonding zone is uniform. A monolithic structure may thereby be generated, that is to say that no bond seam can be made visible in a cross section of the bonding zone made upon completion of the bonding process.

The method variants mentioned above allow for a gentle treatment of the reactor layers since the bonding temperature can be selected to be as low as possible. With the bonding methods indicated, the bond seams obtained exhibit high homogeneity, corrosion stability and strength. Ideally, a monolithic structure is formed, that is to say that no bond seam is visible in a cross sectional photomicrograph, even after appropriate preparation of the sample. The thickness of the deposited bonding layers preferably ranges from 0.2 to 100 μm, preferably from 1 to 40 μm. By controlling the quantity of molten phase, it is made certain that the passageways are not obstructed by the (brazing) solder. In the event a bonding method is used in which the bonding temperature is set to be below the melting temperature of the bonding material, it is impossible that the channels become clogged with bonding material.

For applications in the high temperature range of chemical reactions, a bonding process in the temperature range of from 450 to 1400° C. also offers the possibility to produce reactors with a catalyst coating using the pre-coat method. The method of the invention may also ensure compliance with particularly high requirements placed on the shape and pressure stability of the reactor. Barrier coatings may also be utilized for brazing (hard soldering); they allow for a method analogous to the one described for soft soldering and, as a result thereof, for a lower bonding temperature associated with a higher subsequent re-melt temperature.

The bonding layer is preferably built up from one to three layers; the element and/or alloy combinations are hereby not necessarily chosen in the quantitative proportion of a desired eutectic mixing ratio. The schematic process sequence using hard/high temperature soldering does not differ substantially from the soft soldering method.

If the catalyst were to potentially interact negatively with elements of the base material of the reactor layers, a diffusion barrier may be formed at least in the passageway areas. This barrier may be made from nickel, nickel/phosphorus alloy, iron/phosphorus alloy, gold, rhenium, rhodium, platinum and palladium for example. If the barrier coating and the bonding layer are deposited onto the entire surface, the (brazing) solder system is next deposited onto the diffusion barrier. Otherwise, a diffusion barrier may be obviated. The bonding layer may more specifically be made from silver, copper, iron/phosphorus alloys, nickel/phosphorus alloys, nickel/boron alloys, nickel/carbon alloys, carbon, cobalt, gold, palladium, manganese, chromium and zinc. The overall coating thickness of the bonding layer preferably ranges from 1 to 40 µm, preferably from 1 to 10 µm. This thickness ensures that the passageways will not be obstructed by the (brazing) solder and that very high heat transfer is guaranteed. If the (brazing) solder is deposited on the entire surface, the composition of the (brazing) solder can be chosen so as to concurrently also protect the inside of the passageways against corrosion. The pressure must be applied so as to ensure precise fixation of the reactor layer stack and full-surface contact between the layers.

The connections for supplying the reactants and evacuating products may be made either from metal or from plastic material. If the base material of the reactor layers is made from metal, the connections may be made from the same material. The bonded reactor may preferably be mounted onto cover plates by soldering/brazing, gluing or screwing.

The Figures described herein after will serve to provide a better understanding of the invention.

Figure 1:
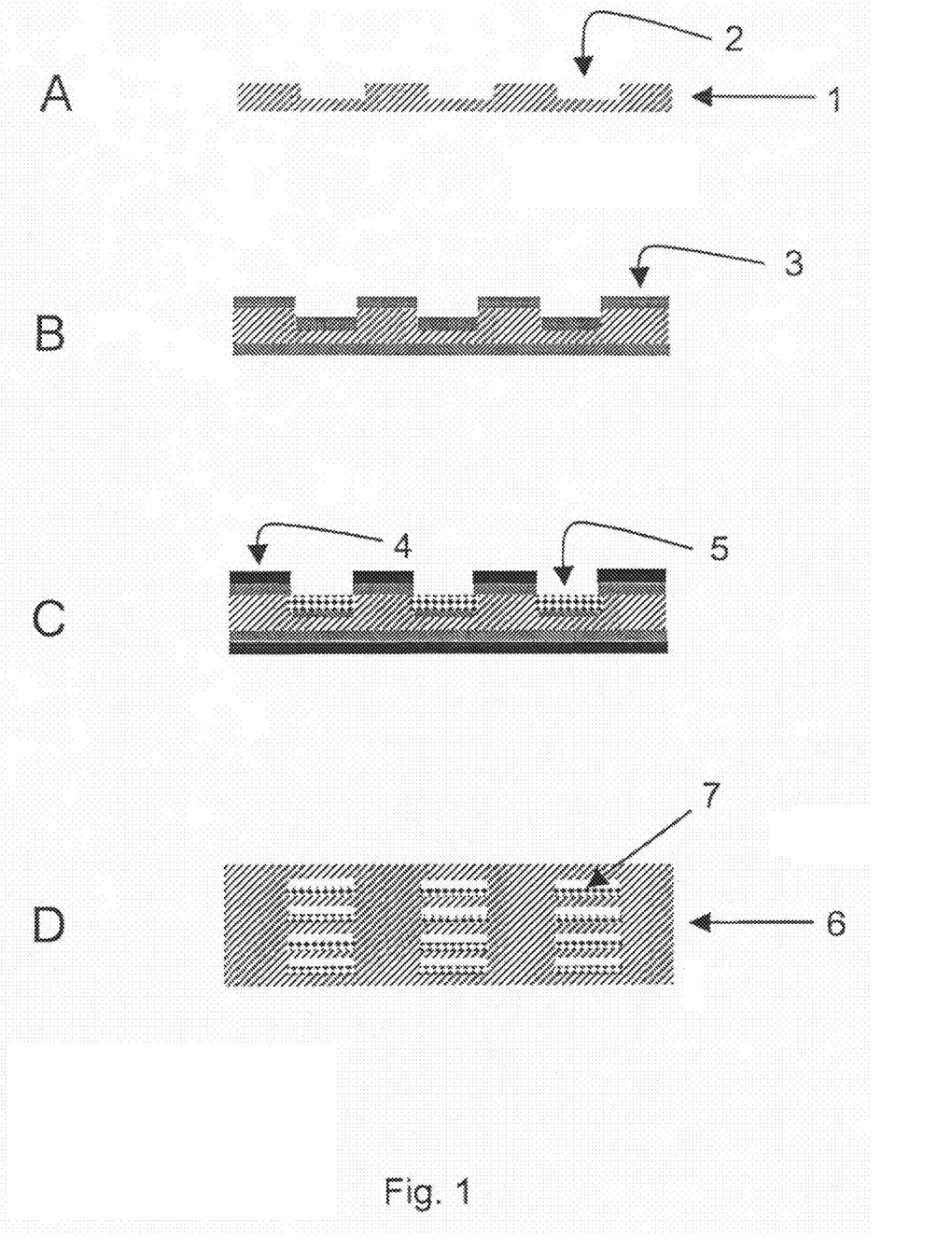
FIG. 1 shows a schematic flow diagram of the method of the invention with deposition of the bonding layer in the bonding areas and passageways.

FIG. 1 indicates a schematic flow diagram of the method of the invention with deposition of the bonding layer in the bonding areas and the passageways:

A reactor layer 1 is schematically illustrated at A. This layer 1 may be made from a homogeneous material such as a metal sheet or also from a layered material such as a core with metal layers applied on either side thereof. In a first method step, passageways, in the present case recesses more specifically trenches 2 for reaction channels, are formed in the reactor layer material 1. One of the methods described herein above can be used for this purpose. Illustration B shows that at first a bonding layer 3 is next applied in the bonding areas and passageways. According to illustration C, the reactor layer 1 is then coated with a cover 4 such as a photoresist or lacquer layer in the bonding areas only. After that, the reactor layer 1 is loaded with the catalyst 5 in the recesses 2 (illustration C). Even if catalyst 5 is also deposited onto the cover 4, it will be removed from the reactor layer together with the cover 4 so that finally, the bonding layer 3 in the bonding areas and the catalyst layer 5 in the passageway areas are exposed. The reactor layers 1 are stacked according to illustration D and bonded into one component 6, with the catalyst 5 being concurrently calcined 7. Such type reactor layers may be alternately stacked and bonded together with layers that have not been structured nor coated with catalyst, cover plates with inlets and outlets for the reaction medium being provided at either end face of the stack.

Figure 2:
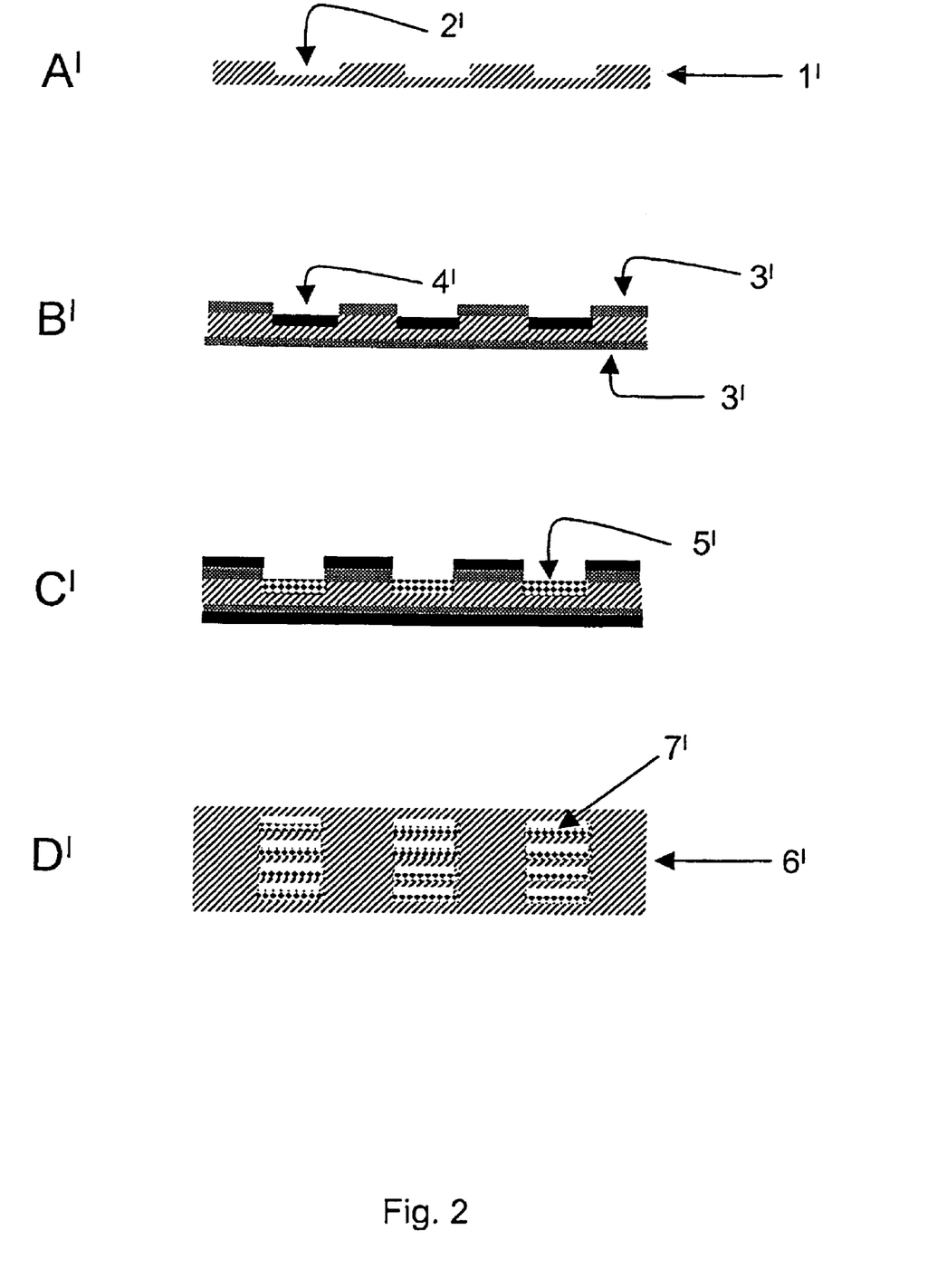
FIG. 2 shows a schematic flow diagram of the method of the invention with deposition of the bonding layer in the bonding areas only.

FIG. 2 shows a schematic flow diagram of the method of the invention with deposition of the bonding layer in the bonding areas only.

The starting material is a base material 1' with passageways 2'. This corresponds to illustration A' in FIG. 2. For producing the bonding layer 3' in the bonding areas only, the passageways 2' are next coated with a cover 4' according to illustration B' so that the bonding layer 3' is prevented from entering the passageways 2' during subsequent deposition of the bonding layer. The bonding layer 3' is located in the bonding areas only. After having removed cover 4', another cover is next applied to prevent catalyst 5' from being applied onto the deposited bonding layer in the next method step. The thus produced intermediate corresponds to the reactor layer shown in illustration C' in FIG. 2. Then, the catalyst is dried, the protective lacquer or resist is removed and a plurality of such reactor layers 1' are stacked and bonded into the component 6'. The catalyst 5' is thereby calcined 7'.

The following examples serve to provide a better understanding of the invention:

EXAMPLE 1

Micro-Structured Reactor Made from AlMg3 for Methanol Steam Reforming

Metal sheets made from AlMg3 were structured by means of photolithography and chemical etching. For this purpose, one of the methods described in DE 197 08 472 C2 were used. For each reactor layer, 63 channels having a cross section of 0.5 mm×0.23 mm and a length of 47 mm were formed in the metal sheet. The overall volume of the channels of one metal sheet was 294 mm$^3$. Further, a cover plate and a bottom plate were produced for terminating the reactor stack. Through bores for the reactor connections were drilled in the cover plate.

Prior to applying a bonding layer onto the bonding areas and the passageways, the reactor sheet was cleaned and pre-treated. This procedure comprised the following discrete steps: 1) degreasing, 2) pickling, 3) zincate pickling (such steps and the chemicals needed therefore are generally known in this art). After a homogenous zincate layer has been produced in the last step of the pre-treatment, metallic deposition of the bonding layer was started according to the following process sequence: 1) 5 µm of nickel (chemically or by electroplating), 2) pre-silver (by electroplating), 3) 8 µm of silver (by electroplating), 4) 3 µm of tin (by electroplating). These method steps as well as the chemicals needed therefore are also generally known in the art.

In another process step, a dry film photoresist (DuPont R PM 110) was laminated, structured and developed on either side of the structured metal sheets so that all the areas of the bonding layers were covered, except for the channels.

Next, a suited catalyst powder (G66-MR of Süd-Chemie AG, Germany) was suspended in 75 wt. % isopropanol with 1 wt. % of a dispersing additive. After milling, the average particle size of the catalyst was 1-5 µm. Finally, the suspension was homogenized for 10 min with an ultrasound disintegrator.

The catalyst suspension was then applied with an air gun onto the surface of the structured face of the metal sheets and dried for 1 h at 100° C.

In another process step, the dry film photoresist was removed by a wet chemical method, the metal sheets were rinsed with deionized water and dried for 1 h at 100° C. The catalyst load was 23 mg for each metal sheet, the average coating thickness of the catalyst was 20 µm.

Five micro-structured, (brazing) solder and catalyst coated metal sheets were next superposed together with the cover and the bottom plate so as to form a stack, with the (brazing) solder being located therein between. A vacuum oven was heated to the desired solder/brazing temperature of 290° C. at a heating rate of 30 K/min. Then, the temperature was maintained for 30 min. A pressure of 4.5 MPa was exerted onto the stack during the entire soldering/brazing process. The cooling phase lasted for 90 min, no active cooling having been provided. The calcination of the catalyst and the bonding of the reactor were performed simultaneously.

The efficiency of the methanol reforming processes was analyzed as follows:

The following relations were derived to calculate the hydrogen yield, i.e., the methanol conversion:

$$H_{2out}[ml/min] = 3 \cdot \frac{H_{2out}[\%]}{100} \cdot \frac{Ar_{in}[ml/min] + CH_3OH_{in}[ml/min] + H_2O_{in}[ml/min]}{3 - 2 \cdot \frac{H_{2out}[\%]}{100}}$$

wherein $H_{2out}$ ml/min is the hydrogen flow at the reactor outlet measured with the gas chromatograph;

$H_{2out}$ [%] is the hydrogen concentration in the gas mixture at the reactor outlet (including argon) measured by the gas chromatograph;

$Ar_{in}$ [ml/min] is the argon flow through the reactor;

$CH_3OH_{in}$ [ml/min] is the methanol steam flow into the reactor;

$H_2O_{in}$ [ml/min] is the water steam flow into the reactor.

$$H_2[\%] = \frac{H_{2out}[ml/min]}{3 \cdot CH_3OH_{in}[ml/min]} \cdot 100$$

wherein $H_2$[%] is the hydrogen yield, related to methanol/water, i.e., the methanol conversion rate.

These formulae are based on the reaction equation for methanol water reforming:

$$CH_3OH + H_2O \longrightarrow CO_2 + 3\,H_2$$

The educt flow during the performance test was 100 ml/min, the composition was 33 mol % of methanol, water and inert gas, respectively.

Figure 3:
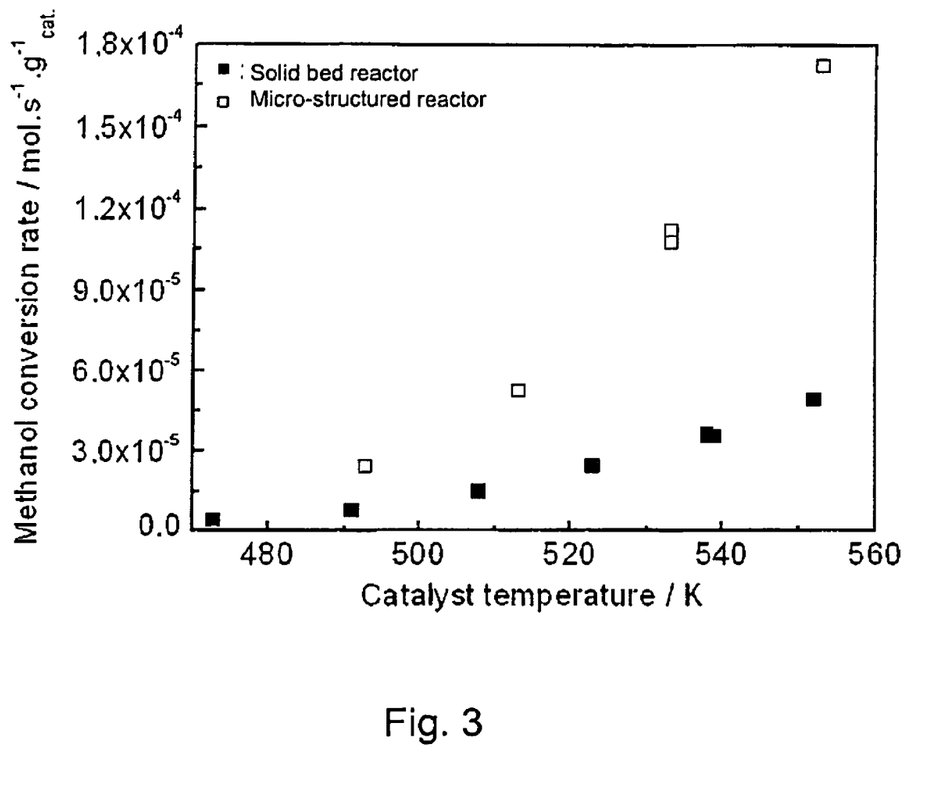
FIG. 3 shows the dependency of the methanol conversion rate (in $mol^{-1} \cdot s^{-3} \cdot g_{CATALYST}^{-1}$) as a function of the reaction temperature of a solid bed reactor loaded with Süd-Chemie (Süd-Chemie AG, Germany) catalyst G-66-MR and a microstructure reactor of Example 1 provided with a coating of the same catalyst.

FIG. 3 illustrates the results of methanol reforming as a function of the reaction temperature as compared to a microreactor produced with the method of the invention using a conventional solid bed reactor.

EXAMPLE 2

A Micro-Structured Reactor Made from Nicrofer 3220H and Bonded at 800° C. for Methane Steam Reforming:

Metal sheets made from Nicrofer 3220H were structured by means of photolithography and chemical etching. For this purpose, one of the methods described in DE 197 08 472 C2 were used. For each reactor layer, 21 channels having a cross section of 0.5 mm×0.25 mm and a length of 28 mm were formed in the metal sheet. The overall volume of the channels of one metal sheet was 115 mm³. Further, a cover plate and a bottom plate were produced for terminating the reactor stack. Through bores for the reactor connections were drilled in the cover plate.

Prior to applying a bonding layer onto the bonding areas and the passageways, the reactor sheet was cleaned and pretreated. This procedure comprised the following discrete steps: 1) degreasing, 2) pickling, 3) electrolytic degreasing, 4) etch cleaning/pickling. In the last pre-treatment step, metallic deposition of the bonding layer was started according to the following process sequence: 1) Ni-strike, 2) nickel/phosphorus alloy with 10-14 wt. % of phosphorus (chemically). These method steps as well as the chemicals needed therefore are also generally known in the art.

In another process step, a dry film photoresist (DuPont R PM 110) was laminated, structured and developed on either side of the structured metal sheets so that all the areas of the bonding layers were covered, except for the channels.

Next, a suited catalyst powder (46-8M of ICI) was suspended in water with the help of one dispersing additive (1 wt. %) and transferred into the channels by means of a dispenser. The metal sheets were dried for 1 h at 100° C.

In another process step, the dry film photoresist was removed by a wet chemical method, the metal sheets were rinsed with deionized water and dried for 1 h at 100° C. The catalyst load was 13 mg for each metal sheet.

Two micro-structured metal sheets coated with an auxiliary bonding layer and with catalyst were next superposed together with the cover and the bottom plate so as to form a stack, with the auxiliary bonding layer being located therein between. A vacuum oven was heated to the desired bonding temperature of 800° C. at a heating rate of 25 K/min. Then, the temperature was maintained for 4 h. A weight of 10 kg was positioned onto the stack during the entire bonding process. The cooling phase lasted for 60 min. Calcination of the catalyst and bonding of the reactor were performed simultaneously.

Figure 4:
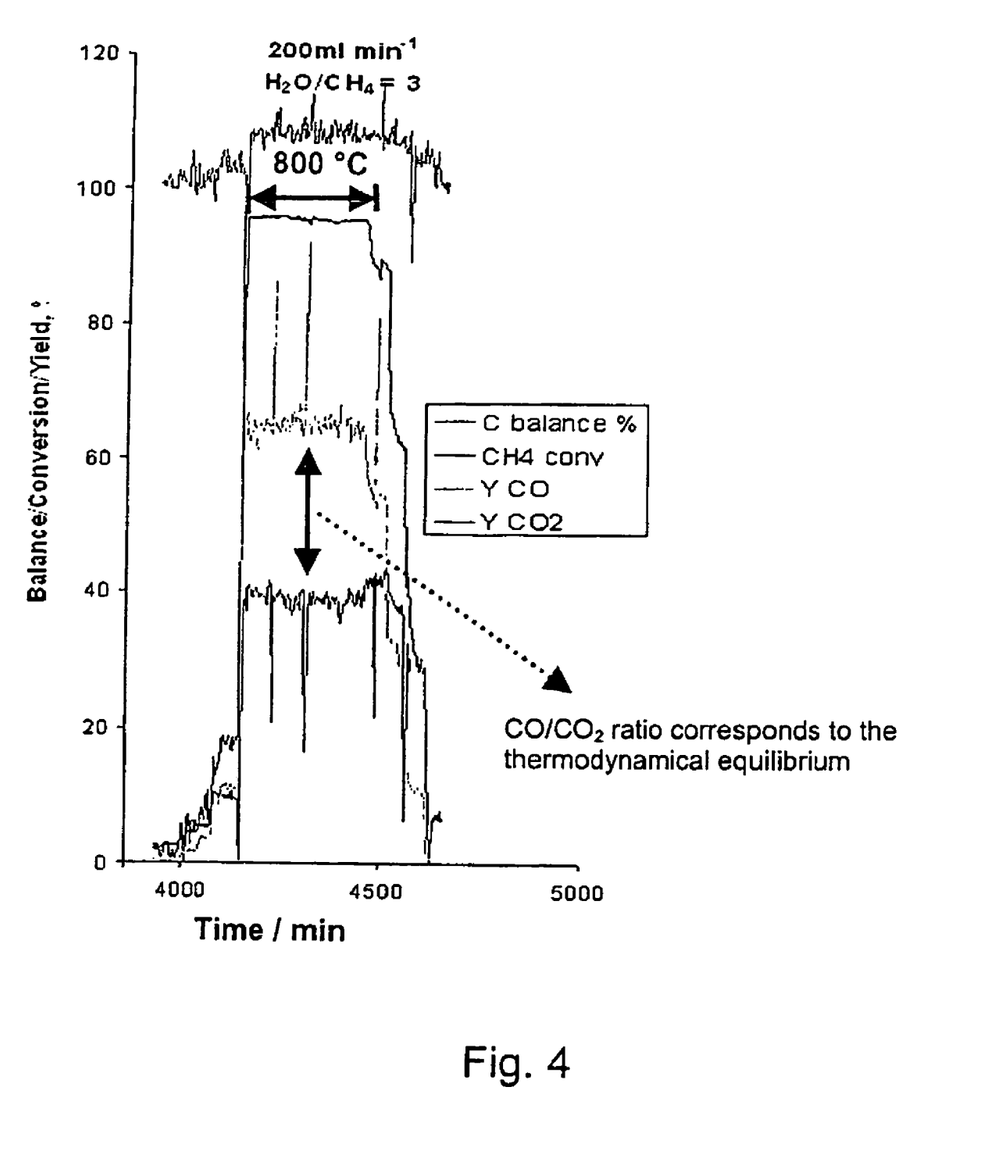
FIG. 4 shows performance data of the micro-structured methane steam reformer of Example 2.
Figure 6:
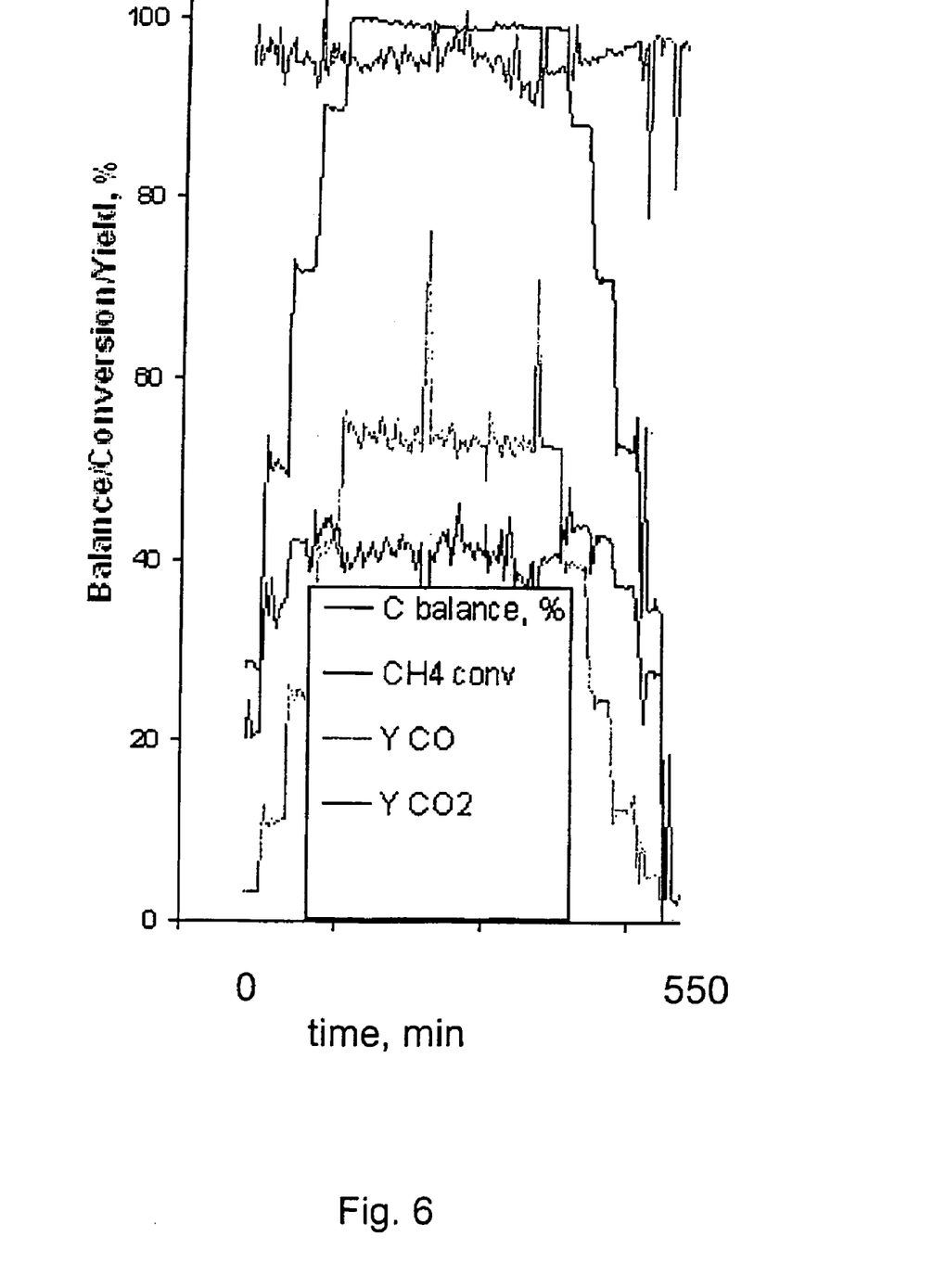
FIG. 6 shows performance data of the catalyst 46-8M (ICI) in a solid bed reactor.

The performance data of the micro-structured reactor for the methane steam reforming at a reaction temperature of 800° C. and a molar steam/methane ratio of 3, are summarized in Table 1 and FIG. 4 (at an educt flow of 200 ml·min⁻¹). For comparison, the activity of the same catalyst in a conventional solid bed reactor is shown in FIG. 6 under the same process conditions. The methane conversions of the reactor of Example 2 and of the conventional solid bed reactor, both having the same catalyst, are comparable; the $CO/CO_2$ ratios in the product flow however differ significantly. A comparison with theoretical data shows that the reactor of Example 2 works at the thermodynamical equilibrium.

TABLE 1

Methane conversion of the micro-structured methane steam reformer of Example 2 and 3 with a molar steam/methane ratio of 3, a reaction temperature of 800° C. and different educt flows.

| Flow rate [ml · min⁻¹] | 100 | 200 | 300 | 400 | 500 |
|---|---|---|---|---|---|
| Bonding temperature [° C.] | | Methane conversion | | | |
| 800 (Example 2) | 98.3 | 84.8 | 56.1 | 27.4 | 11.8 |
| 1100 (Example 3) | <10 | <10 | <5 | ~0 | ~0 |

EXAMPLE 3

A Micro-Structured Reactor Made from Nicrofer 3220H and Bonded at 1100° C. for Methane Steam Reforming The process sequence for producing the reactor corresponds to the one described in Example 2 except that this reactor was bonded for 1 h at a temperature of 1100° C. This temperature corresponds to the temperature typically used for diffusion welding with this material Nicrofer 3220H.

Figure 5:
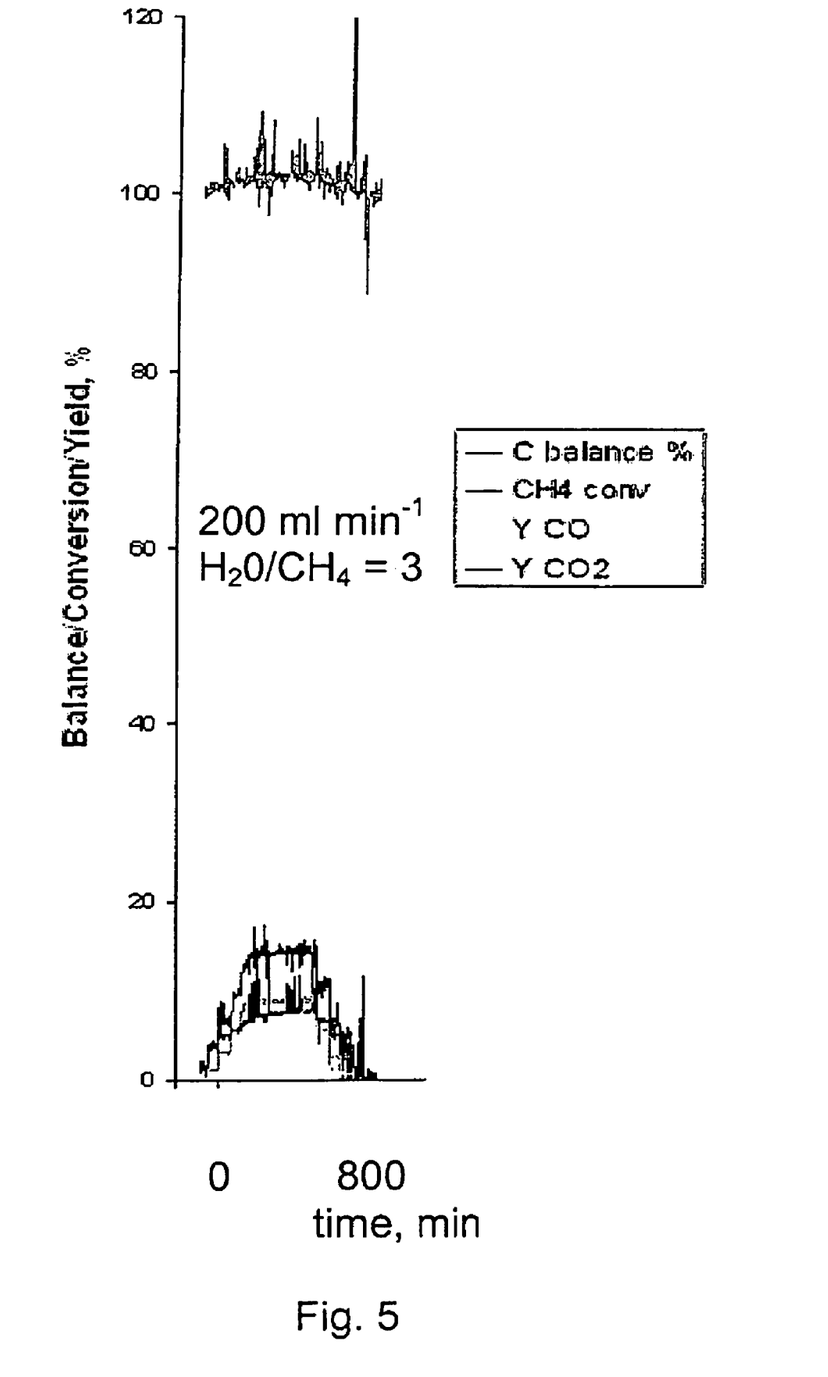
FIG. 5 shows performance data of the micro-structured methane steam reformer of Example 3.

The performance data of the micro-structured reactor for methane steam reforming are summarized in Table 1 and FIG. 5.

It could be evidenced that

1. According to the method of the invention, the performance of the reactor bonded at 800° C. (Example 2) is significantly increased over the performance of the reactor bonded at 1100° C. (Example 3) with respect to educt conversion at the same working point; this allowed showing that the reduction of the bonding temperature according to the method of the invention directly has a positive influence onto the catalyst activity and, as a result thereof, onto the overall performance of the component;
2. The $CO/CO_2$ ratio in the product flow of the reactor of Example 2 corresponds to the thermodynamical equilibrium; the operating range within the thermodynamical equilibrium proves the optimal efficiency of the process management with regard to the yield of the educt flow; compared thereto, the same catalyst in a conventional solid bed reactor has, under identical operating parameters, a $CO/CO_2$ ratio that is far from the thermodynamical equilibrium, thus exhibiting less efficiency and performance than the reactor of Example 2 produced according to the method of the invention.

If is understood that the examples and embodiments described herein are for illustrative purpose only and that various modifications and changes in light thereof as well as combinations of features described in this application will be suggested to persons skilled in the art and are to be included within the spirit and purview of the described invention and within the scope of the appended claims. All publication, patents and patent applications cited herein are hereby incorporated by reference.

What is claimed is:

1. A method of manufacturing a reactor having passageways which are loaded with a catalyst, said method comprising the following method steps:
   a. producing reactor layers having bonding areas and passageway areas in which the passageways are formed,
   b. applying at least one bonding layer onto the reactor layers in the bonding areas,
   c. loading the reactor layers in the passageway areas with the catalyst and
   d. bonding the reactor layers,
characterized in that the at least one bonding layer is applied and masked in the bonding areas before the reactor layers are loaded with the catalyst.

2. The method as set forth in claim 1, characterized in that the at least one bonding layer is applied in the bonding areas only or on the entire surface of the reactor layers.

3. The method of claim 1, characterized in that, before or after application of the at least one bonding layer onto the reactor layers, recesses are formed in the passageway areas on the reactor layers and that said recesses are loaded with the catalyst.

4. The method as set forth in claim 3, characterized in that the recesses are formed using a plating method or by chemical etching, milling, stamping or punching.

5. The method of claim 1, characterized in that the at least one bonding layer is masked with a cover in the bonding areas prior to loading the reactor layers and that said cover is removed after loading.

6. The method of claim 1, characterized in that the catalyst is applied using the wash-coat method.

7. The method of claim 1, characterized in that the catalyst is calcined during bonding of the reactor layers.

8. The method of claim 1, characterized in that the catalyst contains at least one catalyst carrier and at least one catalytic metal.

9. The method of claim 1, characterized in that a layer of an oxide material is formed in the passageway areas on the reactor layers before said reactor layers are loaded with the catalyst.

10. The method as set forth in claim 9, characterized in that the oxide material is selected from the group consisting of aluminium oxide, silica, silicate, alumosilicates, titanium dioxide and zirconium dioxide.

11. The method of claim 1, characterized in that the at least one bonding layer forms a solder or brazing solder layer.

12. The method as set forth in claim 11, characterized in that the solder or brazing solder layer is formed from at least one high melting partial solder or brazing solder layer and at least one low melting partial solder or brazing solder layer.

13. The method as set forth in claim 12, characterized in that the at least one high melting partial solder or brazing solder layer is made from at least one metal, selected from the group consisting of silver, gold, nickel and copper.

14. The method of claim 12, characterized in that the at least one low melting partial solder or brazing solder layer is made from at least one metal selected from the group consisting of tin, indium and bismuth.

15. The method of claim 12, characterized in that the high melting partial solder or brazing solder layer is made from silver and the low melting partial solder or brazing solder layer is made from tin.

16. The method of claim 12, characterized in that the reactor layers are bonded using a melt diffusion soldering or brazing method.

17. The method of claim 1, characterized in that the at least one bonding layer is an auxiliary bonding layer.

18. The method as set forth in claim 17, characterized in that the auxiliary bonding layer is made from at least one element, selected from the group consisting of carbon, silver, copper, iron, nickel, gold, palladium, manganese, chromium and zinc or from an alloy of at least one metal selected from the group consisting of nickel, iron, cobalt, chromium and manganese, with at least one element selected from the group consisting of phosphorus, boron and carbon.

19. The method of claim 1, characterized in that a multifunctional barrier coating is applied in the bonding areas to the reactor layers prior to applying the at least one bonding layer.

20. The method as set forth in claim 19, characterized in that the barrier coating is made from at least one metal selected from the group consisting of molybdenum, manganese, iron, iron/phosphorus alloys, rhenium, rhodium, platinum, palladium, nickel and nickel/phosphorus alloys, and has a thickness ranging from 1 through 20 µm.

21. The method of claim 1, characterized in that the reactor layers are made from metal.

22. The method as set forth in claim 21, characterized in that the metal is selected from the group consisting of copper, tantalum, aluminium, nickel, titanium and the alloys thereof and stainless steels.

23. Use of the reactor produced according to claim 1 as a hydrocarbon and alcohol reformer.

24. The method of claim 13, characterized in that the at least one low melting partial solder or brazing solder layer is made from at least one metal selected from the group consisting of tin, indium and bismuth.

25. A method of reforming one or more compounds selected from the group consisting of hydrocarbons and alcohols, including:
   a. providing a reactor having passageways which are loaded with a catalyst, said method comprising the following method steps:
      i. producing reactor layers having bonding areas and passageway areas in which the passageways are formed,
      ii. applying at least one bonding layer onto the reactor layers in the bonding areas,
      iii. loading the reactor layers in the passageway areas with the catalyst and
      iv. bonding the reactor layers,
   characterized in that the at least one bonding layer is applied and masked in the bonding areas before the reactor layers are loaded with the catalyst, and
   b. reacting said one or more compounds.

* * * * *